Aug. 26, 1958 W. D. SCHAEFFER ET AL 2,849,511
SEPARATION OF ORGANIC COMPOUNDS
Filed May 25, 1953 2 Sheets-Sheet 1

INVENTORS.
WILLIAM D. SCHAEFFER,
ART C. McKINNIS,
WILLIAM SMITH DORSEY,
BY Lannas S. Henderson
AGENT.

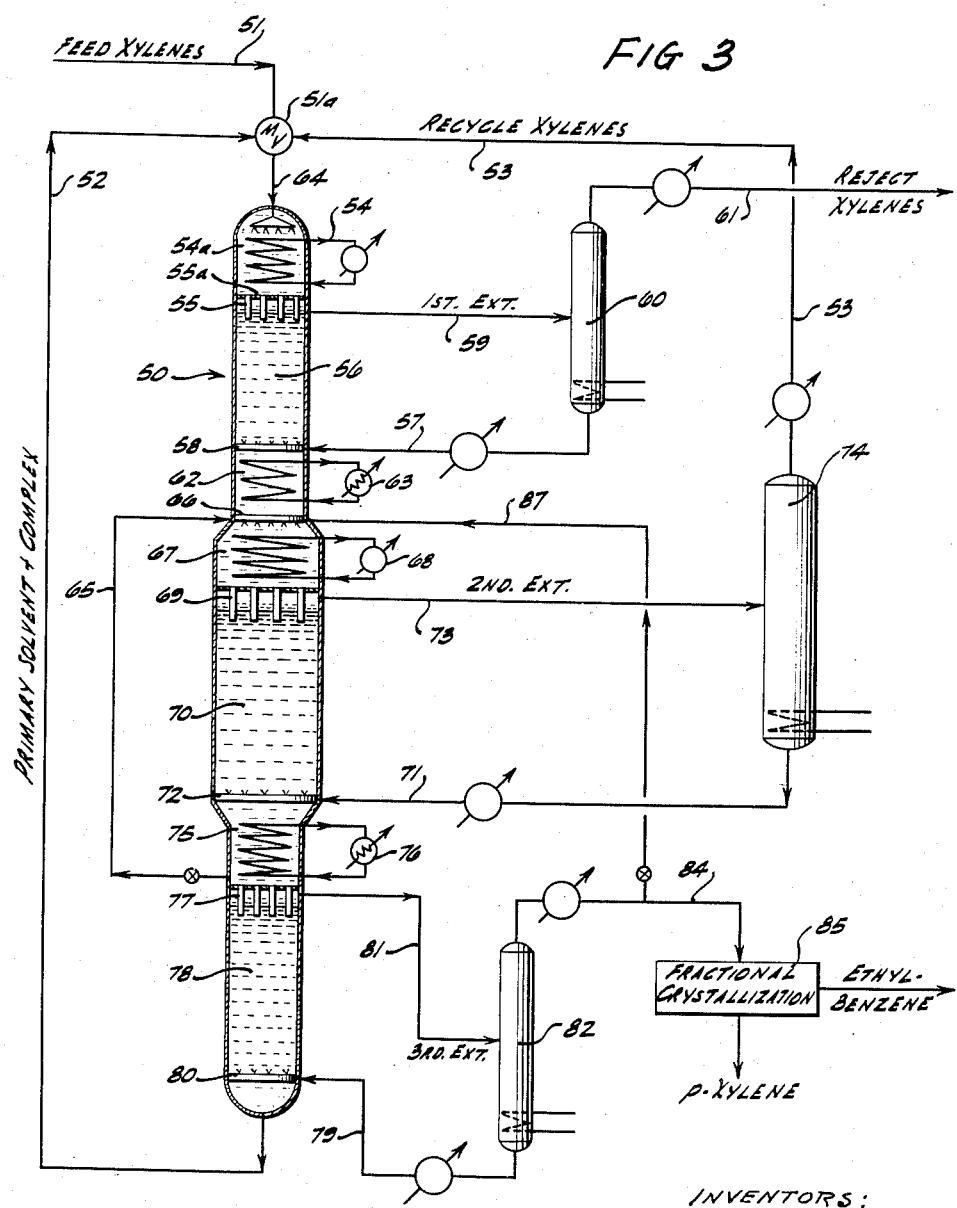

United States Patent Office 2,849,511
Patented Aug. 26, 1958

2,849,511

SEPARATION OF ORGANIC COMPOUNDS

William D. Schaeffer, Ontario, Art C. McKinnis, Long Beach, and William Smith Dorsey, Fullerton, Calif., assignors to Union Oil Company of California, Los Angeles, Calif., a corporation of California Application May 25, 1953, Serial No. 356,993

31 Claims. (Cl. 260—674)

This invention relates to methods for separating organic compounds which differ in molecular configuration, particularly compounds which have similar chemical and physical properties, and are therefore difficultly separable by conventional methods such as fractional distillation or crystallization. Broadly stated, the method consists in selectively absorbing one or more components of the feed mixture into a solid Werner-type complex of a metal salt and a basic nitrogen compound, and thereafter recovering the absorbed component from the complex. This procedure may be designated as extractive crystallization, or "clathration."

More specifically, the method of clathration contemplated herein involves first forming a homogeneous solution of the Werner complex and the total feed mixture to to be resolved in a solvent which is capable of dissolving both the Werner complex and the feed mixture at certain temperatures, but which has a low solvent capacity for the Werner complex at lower temperatures. After the homogeneous solution is formed it is then cooled to a point where the solid complex precipitates out as a solid phase, thereby forming a non-homogeneous slurry. Part or all of the feed mixture may also precipitate out as a separate liquid phase. The solid Werner complex, in precipitating, simultaneously and selectively absorbs one or more components from the feed mixture, which components are thereby segregated into the solid phase. The solid phase and the liquid phase or phases of the slurry are then separately treated for recovery of their respective components of the feed mixture. These separate treatments may be effected without physically separating the solid phase from the liquid phase, or the two phases may be separated prior to the separate treatments.

Figure 1:
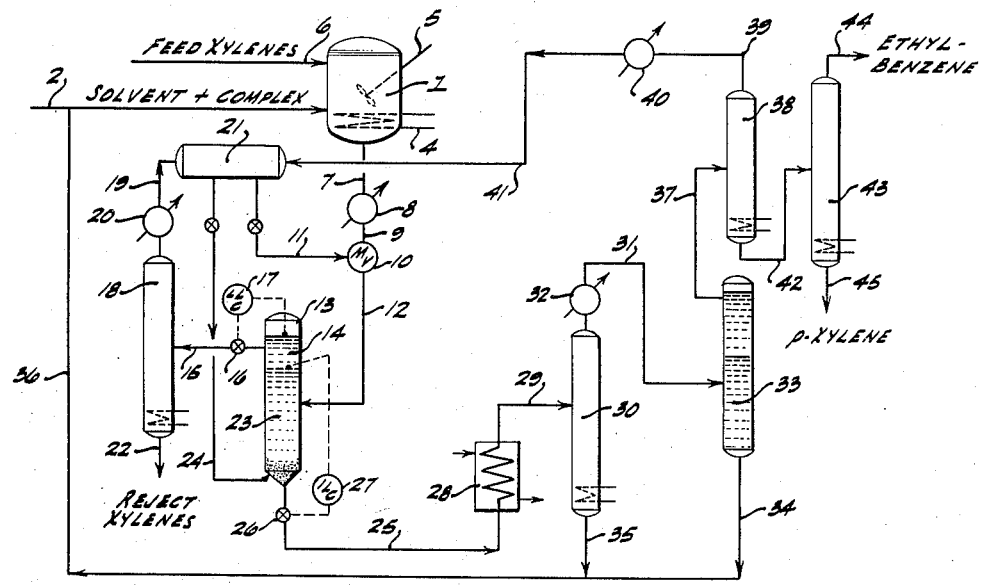
Figure 2:
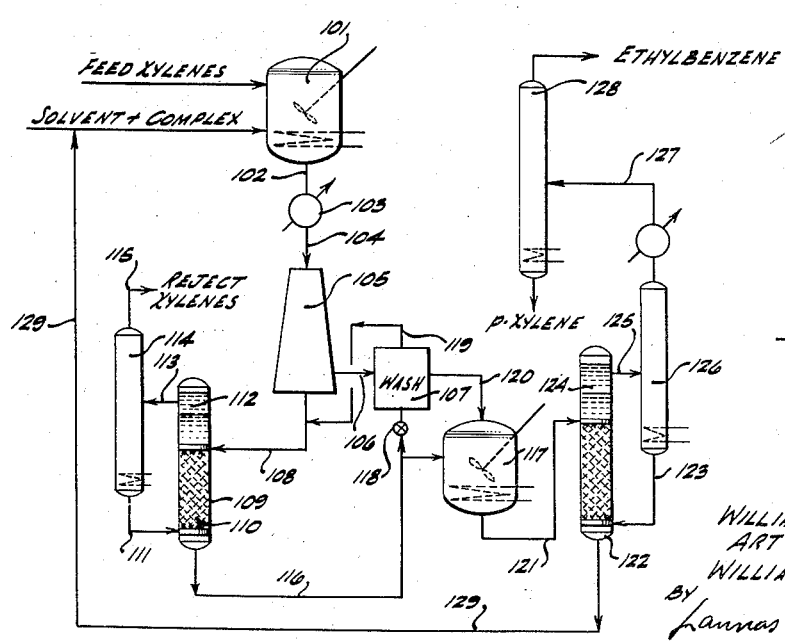

The attached Figures 1, 2 and 3 are schematic flow diagrams illustrating three alternative modifications for treating the cool slurry of clathrate plus solvent for recovery of the feed components. These modifications will be more particularly described hereinafter.

It is an object of this invention to provide economical means for separating mixtures of two or more organic compounds which are difficult to separate by ordinary physical or chemical methods.

Another more specific object is to provide methods of employing solid Werner complexes for separating organic compounds by extracting crystallization which avoids expensive procedural steps such as filtration, solids drying, solids handling, etc.

Another object is to provide methods whereby the feed components which are absorbed into the Werner complex may be recovered therefrom with little or no decomposition of the Werner complex, which is therefore recovered in condition for recycling to the absorption step without preliminary rejuvenation or purification.

A specific object is to provide economical means for separating liquid hydrocarbon isomers of closely similar structure such as meta- and para-xylene.

Other objectives will be apparent from the more detailed description which follows.

In its preferred form, the principal feature of the invention consists in first dissolving the Werner complex and the feed mixture at elevated temperatures in an aliphatic polyhydroxy compound, hereinafter termed the primary solvent, then cooling the resulting solution to precipitate the Werner complex as a clathrate with one or more components of the feed mixture. From this point the resulting cool slurry may be treated according to any of the three alternative recovery procedures described herein.

In the first recovery system (Figure 1) the cool slurry is extracted with another solvent, hereinafter termed the secondary solvent, which is capable of dissolving the components of the feed mixture, but which has a very limited solubility in and for the primary solvent, and for the Werner complex. The secondary solvent extract is then processed for recovery of the non-clathrated feed components. The remaining raffinate slurry of clathrate plus primary solvent is then heated to redissolve the clathrate, thereby liberating the clathrated components of the feed mixture. The hot solution so formed is then treated by distillation to recover the previously clathrated feed components.

According to the second recovery system illustrated (Figure 2) the cool slurry of clathrate plus primary solvent is first separated as by filtration, settling, centrifuging etc. The resulting filtrate is then treated for recovery of the unclathrated components of the feed mixture, as by extraction with a secondary solvent, or by distillation. The solid clathrate may then be redissolved in the stripped primary solvent, thereby liberating the clathrated feed components which may be recovered by solvent extraction with a tertiary solvent, or by distillation. If a tertiary solvent is employed, it should have characteristics similar to the secondary solvent, and may be identical thereto. The tertiary solvent extract is then processed as by distillation for recovery of the previously clathrated feed components.

According to the third recovery system illustrated (Figure 3) the cool slurry of clathrate plus primary solvent is first treated by e. g. decantation or extraction with a secondary solvent to recover the non-clathrated feed components, and the remaining slurry is then heated to redissolve the clathrate in the primary solvent thereby liberating the clathrated components which are then recovered from the solvent by a tertiary solvent extraction procedure. The tertiary solvent extract is then treated by e. g. distillation to recover the previously clathrated feed components. This modification is illustrated multistagwise in Fig. 3.

Each of the above procedures is characterized by its own peculiar advantages which will become more apparent from the ensuing detailed description. In all cases, where secondary and tertiary solvents are employed they are preferably, though not necessarily, identical.

The methods described herein are particularly valuable for separating hydrocarbon isomers. Such isomers for example as meta- and para-xylene are especially difficult to separate by such conventional methods as fractional distillation or azeotropic distillation. Some degree of resolution may be obtained by fractional crystallization, but repeated stages are necessary, with correspondingly low yields, in order to obtain any one of the components in reasonably pure form. Obviously also, the chemical properties of such isomers are so nearly identical as to render separation by conventional chemical procedures very difficult. Moreover, most of the heretofore proposed chemical separation processes, such as selective sulfonation, are inherently uneconomical.

The present invention is based upon the discovery that certain crystalline metal complexes of the Werner type are capable of selectively absorbing or occluding during or after formation of their crystalline structure, certain organic compounds, while other organic compounds of similar gross physical properties are absorbed to a much smaller extent, or not at all. The theoretical explanation for this phenomenon is not known with certainty, but present information indicates that a "clathrate" type compound may be formed with the absorbed organic compound. These clathrates, when formed in the presence of an excess of pure absorbable compound, are found to contain the absorbed component in a constant proportion or combining ratio, wherein, however, such combining ratio is not necessarily that of any small integer. Present evidence indciates that the absorbed component is occluded within the voids of the crystal lattice, and the selectivity of absorption implies that there is an optimum molecular configuration of absorbate for maximum absorption in a particular crystal lattice. In the present case, the Werner complexes employed are found to favor, for the most part, the absorption of para compounds over the ortho- or meta-isomers, and relatively branched-chain aliphatics as opposed to relatively straight-chain aliphatics of the same or similar molecular weight. However, by suitably modifying the constituents of the complex employed, this order may be reversed so that meta- and ortho-compounds may be selectively absorbed in preference to the para-isomers, and straight-chain aliphatics in preference to branched-chain.

The primary solvents employed herein may be defined broadly as those which are capable of dissolving appreciable amounts of both the Werner complex and the feed mixture at a given temperature range, but in which at least the Werner complex is appreciably less soluble at lower temperatures. The feed mixture may also be less soluble at low temperatures. In addition, if any of the feed components are to be recovered therefrom by distillation, the primary solvent should have a boiling point sufficiently above or below that of the particular component to permit ready separation thereof by fractional distillation. Ordinarily any solvent boiling at least about 5° C. above or below the boiling point of the feed component may be employed. A particularly valuable group of solvents for these purposes are the lower aliphatic dihydroxy or trihydroxy compounds, especially glycols. Such solvents include for example, ethylene glycol, 1,2-propylene glycol, 1,3-propylene glycol, diethylene glycol, triethylene glycol, dipropylene glycols, glycerol, glycerol monoethers, 1,3-butanediol, 2,3-butanediol, 1,4-butanediol, 2-butene-1,4-diol, and mixtures of these and similar materials. Other materials such as water, ethanol, or hydrocarbons may also be added in some cases to modify the solvent properties of the polyhydroxy compounds. The above types of solvents are satisfactory for separating aromatic hydrocarbons in general. Other solvents may be used for resolving mixtures of alpatic hydrocarbons.

The secondary and tertiary solvents employed herein may be any materials which, at the extraction temperature, are substantially immiscible with the primary solvent, and in which the respective components of the feed mixture are sufficiently soluble. Preferably also they should boil sufficiently above or below the boiling points of the feed components to permit effective fractional distillation. These solvents should also have very little solvent capacity for the Werner complexes employed, and the secondary solvent must, very importantly, not be capable of dissolving the clathrated feed component from the solid clathrate. Suitable solvents which meet these requirements include for example, the aliphatic hydrocarbons such as propane, butane, pentane, hexene, heptane, octane, nonane, decane, undecane, dodecane, etc., and mixtures thereof such as various petroleum fractions, e. g. petroleum ether, gasoline, kerosene, lube oil fractions, etc. Naphthenic hydrocarbons may also be employed. The paraffinic hydrocarbons are additionally advantageous, when used in conjunction with glycol-type primary solvents, in that the organic nitrogen bases which are an essential component of the Werner complexes described herein are much more soluble in the glycols than in the paraffinic hydrocarbons. Loss of nitrogen base to the secondary solvent is hence minimized.

The Werner-type complexes employed herein are made up of at least three components. The fundamental unit is a metal having an atomic number above 12 which is capable of forming coordinate complexes of the Werner type. This includes primarily the metals of groups IB, IIB, VIB, VIIB, and VIII of the periodic table, such for example as iron, cobalt, nickel, copper, zinc, cadmium, silver, manganese, chromium, mercury, and molybdenum. Aluminum may also be used in some instances.

The second component consists of one or more basic nitrogen compounds which are bound to the central metal atom through coordinate bonds. The complexes are mainly of the tetra- and hexa-coordinate types, wherein the metal atom is combined with four or six molecules of the basic nitrogen compound to form a positive radical which is usually divalent. Examples of suitable nitrogen compounds are set forth hereinafter.

The positive radical (metal+nitrogen base) is in turn combined with a suitable negative radical, such for example as thiocyanate SCN—, iso-thiocyanate NCS—, azide NNN—, cyanate NCO—, isocyanate OCN—, cyanide CN—, sulfate $SO_4$=, nitrate $NO_3$—, nitro $NO_2$—, nitrito ONO—, chloride Cl—, bromide Br—, iodide I—, phosphate $PO_4$≡. A group of negative radicals found to be particularly effective for the present purposes consists of the monovalent radicals thiocyanate, isothiocyanate, azide, cyanate, isocyanate and cyanide. However, any radical may be utilized which is capable of producing a crystalline complex with the above positive radical, which complex will exhibit the desired selectivity for the particular isomer or compound which is to be absorbed. Such complexes are described generally in Modern Aspects of Inorganic Chemistry, Emeleus and Anderson, 79–178, Van Nostrand Co., 1946, and also in Textbook of Inorganic Chemistry, vol. X, M. M. J. Sutherland, J. P. Lippincott Co., 1928. These references also describe general methods which may be employed for preparing the particular complexes employed herein.

The complexes concerned herein may be designated by the following general formula:

$$[X \cdot Z_y \cdot A_n] \quad (1)$$

wherein X is the metal atom as defined above, Z is the basic nitrogen compound, $y$ is a number from 2 to 6, A is the negative radical as above defined, and $n$ is a number from 1 to 3.

The basic nitrogen compounds employed in the above formula should be such as to give a maximum selective absorption for the particular isomer which is to be absorbed into the crystal lattice of the complex. For example, if it is desired to absorb p-xylene, a very suitable nitrogen compound is gamma-picoline. Para-ethyl pyridine is equally suitable. Not all nitrogen compounds are equally effective in forming complexes which will absorb the desired component. For example, the beta-picoline complex with nickel thiocyanate is not as effective as the gamma-picoline complex for absorbing paraxylene, presumably because of the steric effects of the 3-methyl group. However, the beta-picoline complex may be used advantageously for absorbing other compounds. Also a mixture of beta- and gamma-picoline may be employed to form a mixed-crystal form of Werner complex which is suitable for absorbing p-xylene. The nitrogen compounds should therefore be selected by a judicious combination of theoretical reasoning and actual testing of the complexes with the particular mixture to be separated. The over-all molecular dimensions of the nitrogen compound should approximate the molecular dimensions of the compound to be absorbed in the complex. Suitable nitrogen compounds for various applications include for example mono-, di- and trialkyl amines, arylamines, mono- and di- N-substituted arylamines, amino-naphthenes; heterocyclic amines such as pyridine, substituted pyridines, quinolines, pyrroles, piperidines; polyamines such as ethylene diamine, and amines containing other non-interfering functional groups. The heterocyclic amines are a preferred class, and especially the 4-substituted pyridines such as the 4-alkyl-pyridines, 4-hydroxy-pyridine, 4-chloro-pyridine, 4-chloromethyl-pyridine, 4-amino-pyridine, etc.

The Werner complexes defined by Formula I above may be prepared by any of several different methods. According to one method the complex may be formed by precipitation from an aqueous solution. This is ordinarily accomplished by first forming in solution the desired metal salt containing the X and A components of Formula I. To this solution is then added from about two to six molar equivalents of the desired nitrogen compound Z. The insoluble complex thereupon precipitates and is removed and dried. The drying may be accomplished in a stream of air at room temperature, or slightly elevated temperatures may be employed. The substantially dry, powdered or granular complex may then be employed directly in the separation techniques described herein.

Alternatively the complex may be formed in situ during the first step of the herein described process by first dissolving the desired metal salt in the primary solvent and then adding the desired molar ratio of the nitrogen compound. The complex so formed will remain in solution if the solvent is sufficiently hot, and will precipitate from cooler solutions. In any event, the mixture is then heated sufficiently to dissolve both the complex and the feed mixture to be resolved, this constituting the first step of the process.

Examples of suitable complexes which may be employed, corresponding to Formula I above, are as follows:

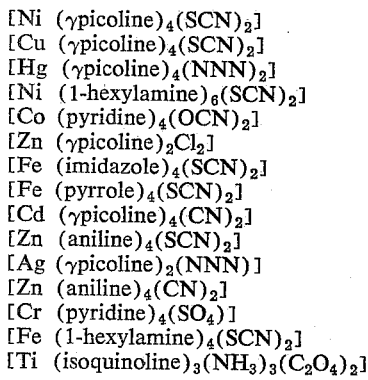

Obviously many other compounds similar to the above could be employed, not all of which would give effective or optimum separation of all isomer pairs, but which should be selected to meet the specific peculiarities of the isomers concerned.

The amount of complex employed, relative to the feed mixture, depends upon its specific capacity for absorbing the particular isomer concerned, and also upon the proportion of that isomer present in the original mixture. The complexes are found in general to be capable of absorbing between about 5% and 70% by weight of absorbable compounds. Optimum efficiency may require that more or less than this "stoichiometric" amount of complex be employed, depending upon its relative capacity for other components in the mixture to be resolved, and the number of clathration stages which are permissible. In general, the amount of complex to be employed may vary between about ¼ to 20 parts by weight per part of clathratable component in the mixture. Smaller proportions of complex will generally yield a purer absorbate, while the larger proportions result in more complete removal of absorbate from the mixture, on the basis of a single-stage batch absorption.

The methods described herein are particularly adapted for the resolution of close-boiling mixtures of aromatic hydrocarbon isomers such as may occur in petroleum fractions, and especially those petroleum fractions which result from catalytic reforming operations such as hydroforming, platforming, etc. For example, there may be obtained from such reformates a particularly refractory cut boiling between about 138–145° C., and consisting essentially of the C–8 aromatic hydrocarbons, ethylbenzene, o-, m- and p-xylene in varying proportions. By close fractionation, it is ordinarily possible to separate out the ethylbenzene and o-xylene, but the meta- and para-xylenes are almost impossible to separate by fractional distillation since the former boils at 139.1° C. and the latter at 138.3° C. By the methods described herein para-xylene may be obtained essentially free of meta-xylene and vice-versa. The ortho-xylene remains in the unabsorbed fraction with the meta isomer and part of the ethylbenzene. The para-xylene and part of the ethylbenzene are absorbed into the complex as the clathrated fraction. Each of these fractions, when recovered, may be further resolved if desired by conventional methods such as fractional crystallization or fractional distillation to obtain the pure individual isomers. In general the aromatic para-isomers may be separated from the ortho- and meta-isomers. It is not essential, however, that the feed mixture consist of isomers; the methods herein described may be applied to any mixtures of close-boiling hydrocarbons which are difficultly separable by conventional methods, particularly aromatic hydrocarbons. For example p-xylene may be selectively absorbed from any mixture of difficultly separable hydrocarbons, which mixture may also include aliphatic or naphthenic hydrocarbons.

Referring more particularly to Figure 1, this first modification of the process, wherein the clathrated fraction of the feed mixture is recovered by distillation, will be described in specific reference to propylene glycol as the primary solvent, and a mixture of ortho-, meta- and para-xylenes and ethylbenzene as the feed mixture. Specifically it is desired to recover para-xylene. It will be understood, however, that the general procedure described is equally applicable, with minor modifications, to other solvents and feed mixtures.

The first step consists in forming in the mixing vessel 1, a homogeneous solution of propylene glycol, the desired Werner complex and the feed mixture. To initiate the process, propylene glycol and solid Werner complex may be admitted to the mixing vessel through line 2. Preferably sufficient Werner complex is employed to yield a nearly saturated solution thereof at, for example, 130° C. In order to achieve complete and rapid solution under these conditions, it may be desirable to heat the mixture by means of steam coil 4, and agitate by means of agitator 5. Alternatively, the Werner complex may be formed in situ in the mixing vessel 1 by separately adding the desired metal salt and the amino compound. It is only necessary to form the solution at the beginning of the process, inasmuch as the solvent-complex solution is continuously recycled through line 2 after the process is initiated.

When the complex is completely dissolved in the solvent, the feed xylenes may be introduced through line 6 while continuing agitation. It is preferable to add sufficient of the xylene mixture to provide between about 2% and 60% by weight of para-xylene to Werner complex. It is usually preferable to maintain the temperature in the mixing vessel 1 slightly below the boiling point of the xylenes in order to avoid the necessity for pressure vessels; however by the use of higher temperatures and a pressure vessel, the solvent capacity of the propylene glycol for the xylenes and the complex may be still further increased.

After the xylenes have been dissolved, the homogeneous mixture is then withdrawn through line 7 and cooled in heat exchanger 8 to preferably between about 10° and 50° C. Upon cooling the mixture, a more or less viscous slurry is formed containing a solid phase and two liquid phases. This slurry is then fed through line 9 to a mixing valve 10, or other equivalent mixing device for admixing and agitating two liquid materials. A secondary solvent is preferably admitted to mixing valve 10 through line 11. This secondary solvent may be, for example pentane. The secondary solvent serves to wash the crystalline phase and remove therefrom most of the ortho- and meta-xylenes which are adsorbed on the surface of the solid material, as well as extracting the unabsorbed xylenes from solution in the primary solvent. After being thoroughly agitated the whole slurry, now of a somewhat less viscous consistency, is transferred through line 12 to decanter 13 wherein the secondary solvent plus the unabsorbed xylenes form a supernatant liquid phase 14. This supernatant phase may be continuously removed via line 15 and valve 16, the latter of which is controlled by liquid-level-control 17 to maintain a constant liquid level in decanter 13. From line 15 the supernatant hydrocarbon phase is admitted to distillation column 18 wherein the secondary solvent is removed over head through line 19, condensed in condenser 20 and passed into storage vessel 21 for reuse. The bottoms from distillation column 18 is removed through line 22 and consists of unabsorbed xylenes, principally meta-xylene and/or ortho-xylene. This mixture may be utilized as such or it may be further purified by fractional crystallization or fractional distillation to obtain the individual isomers. It may be desirable in some cases to employ a secondary solvent which boils at a higher temperature than the xylenes. In this case the xylenes are recovered as overhead from column 18, and the secondary solvent as bottoms.

The lower phase 23 in decanter 13 consists primarily of the propylene glycol and a solid clathrate of the Werner complex plus para-xylene. The clathrate tends to settle to the bottom of the decanter and may, if desired, be further washed with additional quantities of the secondary solvent which may be admitted through line 24. If desired, all the washing and extraction with the secondary solvent may be performed at this stage, and the previous treatment in mixing valve 10 may be omitted. In mixing valve 10, the pentane is automatically diluted with the unabsorbed xylenes, and hence its efficiency as a solvent for removing those materials is reduced. This disadvantage may be overcome by washing the solid phase in decanter 13, after the complex-rejected xylenes have migrated to the supernatant phase.

The slurry of clathrate and propylene glycol forming lower phase 23 may then be removed continuously through line 25 by means of valve 26 and interface level control 27. This slurry is preferably reheated in heater 28 sufficiently to redissolve the complex and liberate the para-xylene. The reheated mixture is then passed through line 29 to distillation column 30, wherein an overhead consisting of the para-xylene-propylene glycol azeotrope is taken off through line 31, condensed in condenser 32 and passed into decanter 33. This particular azeotrope boils at about 133° C. and consists of about 90% hydrocarbons and 10% glycol. The glycol phase settles to the bottom of the decanter 33 and is removed through line 34 and combined with the propylene glycol-complex solution which is removed through line 35 as bottoms from distillation column 30. The combined mixture is then recycled through line 36 to the mixing vessel 1.

The supernatant hydrocarbon phase in decanter 33 consists primarily of para-xylene together with small quantities of pentane. This hydrocarbon phase is passed through line 37 to distillation column 38 wherein the pentane is removed overhead and passed through line 39, condenser 40 and line 41 to storage vessel 21. The bottoms from distillation column 38 is removed through line 42 and passed to second distillation column 43 wherein, if desired, the ethylbenzene is removed as overhead through line 44, and the enriched para-xylene as bottoms through line 45. The para-xylene obtained may be of substantially any desired purity depending upon a number of process variables such as the ratio of feed xylenes to complex, and the efficiency of the pentane washing step. Obviously many variations may be made in the details of the procedure described without departing from the essential features.

Referring now to Figure 2, this flow diagram illustrates a recovery system involving a separation of the solid clathrate from the primary solvent. This modification also involves a secondary solvent extraction to recover reject xylenes, and a tertiary extraction to recover the clathrated xylenes. The initial steps in the process are the same as those described above in connection with Figure 1 and hence will not be repeated in detail. The feed xylenes are admitted to a mixing vessel 101 wherein they are mixed with primary solvent, e. g. propylene glycol, together with the Werner complex. The mixture is heated and agitated until solution is complete whereupon the mixture is withdrawn through line 102, and cooled in heat exchanger 103 to precipitate the clathrate. The resulting cool slurry is withdrawn through line 104 and transferred to a continuous centrifuge 105, or other equivalent liquid-solid separation device. The solid clathrate from centrifuge 105 is removed through line 106 and transferred to a washing vessel 107 to be treated as hereinafter described.

The solid-free solution from centrifuge 105 is essentially free of Werner complex, either dissolved or undissolved, and contains primarily the unclathrated xylenes, either in solution or as a partially immiscible two-phase system. This mixture is withdrawn through line 108 and transferred to a countercurrent solvent extraction column 109. Column 109 may be packed with an inert contact material 110 such as glass beads, marbles, porcelain chips, etc. in order to improve the efficiency of extraction. The use of a packed extraction column is one of the advantages of separating the solid clathrate before performing the extraction; if the whole slurry is extracted with a solvent there is a tendency for packed columns to become clogged with solid clathrate, although this may be overcome to some extent by employing coarse packing and intermittent agitation. The clathrate-free solution entering column 109 from line 108 flows downwardly through packing 110 countercurrently to upflowing secondary solvent which is introduced to the bottom of column 109 through line 111. This secondary solvent may be for example decane. The secondary solvent, in passing upwardly through the column, extracts the xylenes and finally forms a supernatant extract phase 112 consisting of secondary solvent plus xylenes. This extract is withdrawn through line 113 and transferred to a distillation column 114 from which reject xylenes are removed overhead through line 115 and the secondary solvent is removed as bottoms through line 111 for recycle to column 109.

The raffinate from extraction column 109 now consists essentially of propylene glycol which is removed through line 116 and transferred to a second mixing vessel 117. A part of this propylene glycol may be diverted through valve 118 to washing vessel 107 wherein any interstitial reject xylenes are removed from the solid clathrate by washing. The resulting wash liquor is removed through line 119 and recycled to extraction column 109 together with the incoming feed in line 108. The washed clathrate from washer 107 is then transferred via line 120 to mixing vessel 117. Heating and agitation is continued in vessel 117 for a sufficient length of time to re-dissolve the clathrate in the propylene glycol. The resulting hot solution is then drawn off through line 121 and transferred to a tertiary extraction column 122 which is similar to secondary extraction column 109. In the tertiary extraction column the downflowing hot solution of paraxylene in propylene glycol is extracted by upflowing tertiary solvent entering the column through line 123. The supernatant tertiary extract phase 124 containing previously clathrated xylenes plus tertiary solvent is transferred through line 125 to a distillation column 126. Regenerated tertiary solvent is removed as bottoms from column 126, and an overhead is taken off through line 127 which consists mainly of para-xylene with small proportions of ethylbenzene. This mixture may be transferred for example to a second distillation column 128 wherein pure para-xylene is recovered as bottoms and ethylbenzene is recovered overhead as described above. The raffinate from tertiary extraction column 122 consists essentially of primary solvent and dissolved Werner complex. This solution may be withdrawn through line 129 and recycled while still hot to mixing vessel 101.

The details of this modification may also be varied considerably to obtain the same objectives. For example extraction columns 109 and 122 may be replaced by simple distillation columns if desired.

Referring now to Figure 3, this flow diagram illustrates the third major modification of the invention, wherein the reject xylenes are recovered as in Figure 1 by solvent extraction of the whole slurry, and the clathrated xylenes are recovered as in Figure 2 by a tertiary solvent extraction of the hot solution of complex plus primary solvent. This modification also illustrates suitable means and methods for effecting multi-stage clathration, and appropriate reflux procedures whereby maximum purity and recovery of para-xylene may be obtained.

The principal piece of apparatus employed in this modification consists of an elongated, cylindrical column 50, the middle section of which is enlarged in diameter in order to permit a greater volumetric throughput in the middle section while maintaining constant linear flow rates throughout. The various clathration and extraction steps are performed in this column. The column may be constructed of iron, steel, stainless steel or other conventional construction materials, since the reactants are not ordinarily corrosive, and may be of any desired size, depending upon the size of the operation contemplated, and is preferably thermally insulated.

The flow of reactants through column 50 is generally downward. The feed xylenes are brought in through line 51, and are admixed in mixing valve 51a with the hot, recycle solvent-plus-complex solution from line 52, in a manner similar to that described in connection with Figure 1. In addition, a recycle stream of xylenes, derived as hereinafter described, is admitted through line 53 and admixed with the feed materials entering the top of column 50. The final mixture of feed xylenes, recycle xylenes, primary solvent and complex, in the form of a homogeneous solution at e. g. 100° to 160° C., is introduced through line 52 into the top of column 50. This mixture then flows downwardly and is cooled by means of heat exchanger 54 to a temperature sufficiently low to precipitate the clathrate, e. g. 0° to 75° C. This constitutes the first clathration stage, indicated at 54a. The resulting slurry of liquid and solid then flows through downcomers 55, supported by a disc 55a, into a first extraction zone indicated at 56. In this zone the downflowing slurry is contacted counter-currently with the upflowing secondary solvent, which in this case is decane. The decane is introduced through line 57 and liquid distributing ring 58. The extract accumulates in the space surrounding downcomers 55 and is withdrawn through line 59 and transferred to distillation column 60 wherein the unclathrated xylenes are removed as overhead through line 61. The bottoms from column 60 consists of stripped secondary solvent which is recycled through line 57.

The slurry leaving extraction zone 56 passes downwardly into a heating zone 62 which is heated by means of a heat exchanger 63. The distributor ring 58 may be fashioned as a perforated disc in order to prevent any backflow of reactants from heating zone 62 due to convection currents. In heating zone 62 the slurry is brought to a high enough temperature to redissolve the clathrate in the primary solvent. The resulting solution is then ready for the second clathration stage. It contains substantially all of the para-xylene of the feed mixture, together with a reduced proportion of the other xylenes. In this modification, the first clathration stage is illustratively operated to obtain maximum recovery of para-xylene. The second clathration stage is illustratively operated to obtain maximum purity. To accomplish this latter objective it is desirable to effect in the second clathration stage a relatively less complete clathration of the available para-xylene than in the first clathration stage. This may be accomplished for example by operating the second clathration stage at a somewhat higher temperature than the first stage. It may further be desirable to enrich the liquor flowing to the second clathration stage in para-xylene by admixing therewith either a recycle stream of raffinate liquor from the second extraction stage described hereinafter, or a stream of purified p-xylene from the tertiary extraction zone described hereinafter. The recycle raffinate stream may be admitted through line 65 and liquid distributing ring 66. Recycle p-xylene may be admitted to distributing ring 66 from line 87. Any or all of these measures will result in increasing the purity of p-xylene absorbed in the second clathration stage.

The combined mixture of reheated liquor from the first extraction zone plus the hot recycle stream of raffinate from the second extraction zone, and/or recycle p-xylene, is then passed downwardly into the second clathration stage indicated at 67. Clathration is effected by cooling the mixture by means of heat exchanger 68. In general the temperature range for the second clathration stage may be between about 25° and 100° C. The resulting slurry flows downwardly through downcomers 69 into the second extraction zone 70. Here, additional secondary solvent, i. e. decane is admitted through line 71 and solvent distributing ring 72. The resulting second extract is removed through line 73 as described in connection with first extraction zone. This second extract is then fractionated in column 74, thereby recovering an overhead of mixed xylenes which is relatively richer in para-xylene than the reject xylene stream taken off through line 61. This overhead is therefore recycled through line 53 to the incoming feed mixture as previously described. The recycling of this xylene fraction is analogous to an overhead reflux in a distillation column. Conversely, the recycling of raffinate liquor through line 65, or p-xylene through line 87, is analogous to a bottoms reflux in a distillation column. The reflux ratio of xylenes recycled through line 53 may be controlled by varying the temperature of the second clathration stage 67, or by varying the ratio of clathrate former to xylenes employed therein. The bottoms from column 74 consists of secondary solvent which is recycled through line 71.

The extracted slurry which flows past distributor ring 72 now contains a solid clathrate phase containing substantially pure para-xylene. In the modification illustrated this para-xylene is recovered by a tertiary extraction step. To accomplish this the slurry is reheated in heating zone 75 by means of heater 76. The resulting solution flows downwardly through downcomers 77 and contacts countercurrently the upflowing tertiary solvent, e. g. decane in tertiary extraction zone 78. This extraction zone must be operated at a sufficiently high temperature to maintain the complex in solution. Such temperatures may range for example between about 100° to 200° C. The decane solvent is admitted through line 79 and distributor ring 80 as described in the previous extraction zones. The tertiary extract is withdrawn from the top of extraction zone 78 through line 81 and is transferred to distillation column 82. Decane is recovered as bottoms and recycled through line 79. The overhead is removed through line 84, and consists predominantly of para-xylene, together with small proportions of ethylbenzene. This mixture may be further resolved by a fractional crystallization step 85 from which para-xylene may be recovered at 99+ percent purity. Alternatively the fractional crystallization step may be replaced by an efficient distillation column or any other known means for separating ethylbenzene and para-xylene.

The procedure described in connection with Figure 3 is obviously very flexible in nature. By varying the relative temperatures of the various clathration stages, the bottoms recycle ratio and the overhead recycle ratio, the factors of throughput, purity and percent recovery may be varied at will. To obtain highest purity, the first clathration stage may be operated at substantially lower temperatures than the second clathration stage and the recycle stream in line 65 should be relatively large. To obtain a larger throughput per unit of time the clathration stages may be operated at more nearly the same temperature and the recycle streams may be reduced or eliminated. The optimum process variables will depend upon the particular results desired.

Also, for maximum efficiency of the various clathration and extraction stages it may be desirable to include within the column 50 various conventional agitating devices in any or each of the respective heating zones 62 and 75, the cooling zones 54a and 67, and the extraction zones 56, 70 and 78. Other modifications will occur to those skilled in the art.

The following examples will serve to illustrate the critical features of the invention, but they should not be considered as delineating the scope of the invention.

EXAMPLE I

A sample of the nickel thiocyanate-gamma-picoline Werner complex was prepared as follows: An aqueous solution of nickel thiocyanate was formed by adding two molar equivalents of potassium thiocyanate to a 10% solution of nickel chloride. To this solution was added with stirring four molar equivalents of gamma-picoline. A blue precipitate settled out almost immediately, and was recovered by filtration. The precipitate was dried in a stream of air at room temperature, and was found by analysis to correspond to the formula:

[Ni(gamma-picolino)$_4$(SCN)$_2$]

By procedures similar to the above, merely substituting the appropriate metal salt or amine, samples of the following compounds were prepared:

[Co(gamma-picolino)$_4$(SCN)$_2$]
[Ni(4-ethyl-pyridine)$_4$(SCN)$_2$]
[Fe(gamma-picolino)$_4$(SCN)$_2$]
[Mn(gamma-picolino)$_2$(beta picolino)$_2$(SCN)$_2$]

EXAMPLE II

Forty grams of the Werner complex of nickel thiocyanate with 4-ethyl-pyridine

[Ni(4-ethyl-pyridine)$_4$(SCN)$_2$]

prepared as outlined above, was placed in a Dewar condenser equipped with a stirrer, and 100 ml. of 1,2-propylene glycol was added. The mixture was heated by boiling xylenes in the outer jacket and agitated until solution was complete. The final temperature was 137° C., at which point 35 ml. of a mixture of xylenes and ethylbenzene having the composition shown in Table 1 was added. After agitating the mixture for about two minutes, the hydrocarbons went into solution, forming a homogeneous, clear green solution.

After the hydrocarbons had completely dissolved, heating was discontinued and the mixture was allowed to cool, with continued agitation. At about 92° C. the solution became turbid, and crystals began to form. Cooling was continued to about 28° C., resulting in further crystal formation, as well as the precipitation of complex-rejected hydrocarbons in a second liquid phase. The mixture was allowed to stand until the phases became distinct. About 16 ml. of rejected hydrocarbons was recovered (sample No. 1).

The remaining solid plus the propylene glycol was then reheated and distilled. About 13 ml. of azeotropic distillate boiling between 133–144° C. was recovered. This distillate, upon condensation and cooling, separated into two phases. The upper hydrocarbon phase was recovered by decantation and washed with dilute HCl to remove any 4-ethyl-pyridine which might be present as a result of decomposition of the Werner complex during distillation. The lower phase (propylene glycol) plus the acid wash was combined (sample No. 3) and analyzed for nitrogen, and the upper hydrocarbon phase (11.5 ml., sample No. 2) was analyzed by ultra-violet absorption for its xylene isomer content. The rejected hydrocarbons (sample No. 1) were similarly analyzed for xylene isomer content. The results were as follows:

*Table 1*

| Sample | p-Xylene, vol. percent | m-Xylene, vol. percent | o-Xylene, vol. percent | EtBz, vol. percent |
|---|---|---|---|---|
| Feed | 24.6 | 55.6 | 11.7 | 4.7 |
| (1) Rejected hydrocarbons | 15.9 | 62.1 | 13.6 | 5.5 |
| (2) Absorbed hydrocarbons | 38.4 | 44.2 | 9.6 | 4.1 |

This example shows that even without washing the crystals of clathrated Werner complex to remove adsorbed xylenes, a xylene feed containing 24.6% p-xylene may be split in a single absorption stage into a rich fraction which is more than twice as rich in p-xylene as the corresponding lean fraction. By subjecting the rich phase to a second extractive crystallization, a still further enriched p-xylene fraction may be obtained. Conversely, the lean phase may be still further depleted in p-xylene by reabsorption.

The sample No. 3, consisting of the acid wash plus the distilled propylene glycol showed a nitrogen content of 0.158% by weight. This represents a decomposition of the Werner complex during distillation amounting to only 0.88%. This decomposition may be still further reduced by employing a more efficient fractionating column to separate the xylene-propylene glycol azeotrope (B. P. 133° C.) from the 4-ethyl-pyridine (B. P. 163° C.). Also, higher boiling amino compounds, or lower boiling glycols may be employed to reduce decomposition.

EXAMPLE III

By repeating the procedure of Example II using ethylene glycol as the solvent and the ferrous thiocyanate complex of gamma-picoline [Fe(gamma-picoline)$_4$(SCN)$_2$] as the clathrate former, a substantially similar resolution of the feed mixture is obtained, with less than 1% decomposition of the Werner complex.

EXAMPLE IV

In a manner similar to that described in Example II, 30 grams of the cobalt thiocyanate complex of gamma-picoline [Co(gamma-picolino)$_4$(SCN)$_2$] was dissolved in 100 ml. of propylene glycol at about 135° C. Thirty ml. of mixed xylenes plus ethyl-benzene was then dissolved in the solution, which was a deep blue in color. The solution was then cooled to room temperature with agitation, whereupon a slurry of pink crystals was formed. The cooled mixture was then washed by agitation with 40 ml. of a paraffinic-naphthenic hydrocarbon fraction boiling between 60° C. and 71° C. (Skellysolve B), and the mixture was then allowed to stand for a period of time sufficient to permit phase separation. A total of 45 ml. of supernatant hydrocarbon phase was recovered, consisting of the hydrocarbon wash plus rejected xylenes (sample No. 1).

The propylene glycol phase plus the pink solid material was then heated and subjected to distillation. A total of 10.2 ml. of azeotropic distillate boiling between 68°–134° C. was collected, which upon cooling separated into 9.1 ml. of a supernatant hydrocarbon phase (sample No. 2) and 1.1 ml. of a lower propylene glycol phase. The upper phase was separated and washed with HCl and the washings were combined with the lower phase for nitrogen analysis (sample No. 3). Analysis of samples 1 and 2 gave the following results:

*Table 2*

| Sample | Percent Xylenes | Composition of xylenes in sample, vol. percent | | | |
|---|---|---|---|---|---|
| | | p-Xylene | m-Xylene | o-Xylene | EtBz |
| Feed | 99.8 | 23.9 | 53.8 | 14.3 | 8.0 |
| (1) Rejected hydrocarbons | 64.5 | 11.2 | 64.8 | 16.6 | 7.4 |
| (2) Absorbed hydrocarbons | 63.2 | 47.8 | 37.7 | 7.9 | 6.6 |

Sample No. 3 showed a nitrogen content of .078 wt. percent, corresponding to 1.65% decomposition of the Werner complex.

This example shows in general that by employing a wash solvent to remove adsorbed xylenes from the surface of the solid clathrate, a feed mixture containing 23.9% p-xylene may be resolved in a single stage to obtain a rich phase which is more than four times as rich in p-xylene as the corresponding lean phase, or twice as rich as the feed mixture. By repeated absorption stages, p-xylene of substantially any desired purity may be obtained.

EXAMPLE V

By repeating the procedure of Example IV but substituting diethylene glycol as the solvent, and the manganous thiocyanate complex of gamma-picoline

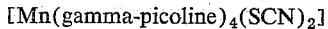
[Mn(gamma-picoline)$_4$(SCN)$_2$]

as the clathrate former, a substantially similar resolution of the feed mixture is obtained.

EXAMPLE VI

The procedure of Example IV is repeated except that a mixture of 60% m-xylene and 40% ethylbenzene is employed as feed mixture. The rejected hydrocarbon phase is found to be substantially enriched in m-xylene, and the absorbed phase, as recovered by distillation, is substantially enriched in ethylbenzene. This example shows that ethylbenzene is selectively absorbed in preference to m-xylene.

EXAMPLE VII

The procedure of Example IV is repeated except that instead of recovering the absorbed xylenes by distillation, a solvent extraction with decane at 120° C. is employed, in a manner similar to that described in Example IV. The xylenes recovered by this method are of substantially the same composition as set forth in Table 2.

EXAMPLE VIII

Two hundred grams of cobalt-tetra (gamma-picolino) dithiocyanate was dissolved in 500 grams of diethylene glycol at 105° C., and 100 grams of mixed C-8 hydrocarbons having the composition shown in Table 3 was added. The resulting homogeneous solution was then cooled to 38° C. to precipitate the clathrate. The resulting slurry was then agitated and extracted serially with four 73 gram portions of decane to remove reject xylenes. The four reject xylene extracts were then separately analyzed for xylene isomer content.

The cool slurry remaining after the reject-xylene extractions was then heated to 105° C. to redissolve the clathrate. The resulting hot solution was then extracted serially with three 73 gram portions of decane, and the extracts analyzed for xylene isomer content. The results were as follows:

*Table 3*

| | Weight, gms. | Volume percent (average for combined extracts) | | | |
|---|---|---|---|---|---|
| | | p-Xylene | m-Xylene | o-Xylene | EtBz |
| Feed mixture | 100 | 19.2 | 49.5 | 16.5 | 14.8 |
| Reject xylenes | 54.1 | 3.2 | 61.8 | 21.6 | 13.4 |
| Clathrated xylenes | 29.4 | 44.0 | 29.0 | 9.8 | 17.0 |

This example shows that solvent extraction to recover the absorbed and unabsorbed xylenes from their respective phases, gives results comparable to those shown in Example II. This procedure however is advantageous in that it requires less heating and consequently results in less decomposition of the Werner complex. Nickel-tetra (gamma-picolino) dithiocyanate gives substantially the same results.

From the above description it will be seen that the invention described herein provides a remarkably efficient method for separating xylene isomers by extractive crystallization with Werner complexes, and that the procedure requires a minimum of expensive procedural steps such as filtration, solids drying, solids transfer, etc. By substituting other hydrocarbon mixtures, or other mixtures of organic compounds, for the feed mixtures of the examples, similar separations may be achieved, either with the same Werner complexes or others as disclosed herein.

This application is a continuation-in-part of application Serial No. 309,874, filed September 16, 1952, and now abandoned.

The foregoing disclosure of this invention is not to be considered as limiting since many variations may be made by those skilled in the art without departing from the scope or spirit of the following claims.

We claim:

1. A process for resolving a mixture of aromatic hydrocarbons differing in molecular configuration by extractive crystallization with a solid Werner complex, said Werner complex consisting of a metal salt coordinated with 2 to 6 moles of a heterocyclic nitrogen base, which comprises dissolving said hydrocarbons and said Werner complex in a solvent consisting essentially of a lower aliphatic poly-alcohol containing not more than three hydroxyl groups, cooling the resulting solution to precipitate a solid clathrate phase composed of said Werner complex containing intimately absorbed therein the most readily clathratable fraction of said hydrocarbons, thereby leaving a less readily clathratable fraction of said hydrocarbons in a phase distinct from said solid clathrate phase, and thereafter recovering said hydrocarbon fractions separately from said two phases.

2. A process as defined in claim 1 wherein said solvent is selected from the group consisting of lower alkylene glycols and lower alkylene polyglycols.

3. A process as defined in claim 1 wherein said mixture of aromatic hydrocarbons comprises isomeric alkylbenzene.

4. A process as defined in claim 1 wherein said metal salt is selected from the group consisting of the cyanides, thiocyanates, isothiocyanates, azides, cyanates and isocyanates of metals of atomic number above 12.

5. A process for resolving a mixture of aromatic hydrocarbons comprising at least two C-8 alkyl benzene isomers by extractive crystallization with a solid Werner complex, said Werner complex consisting of a metal salt coordinated with 2 to 6 moles of a 4-substituted pyridine base, which comprises dissolving said hydrocarbons and said Werner complex in a solvent, said solvent consisting essentially of a member selected from the group consisting of lower alkylene glycols and lower polyalkylene glycols, cooling the resulting solution to precipitate a solid clathrate phase composed of said Werner complex containing intimately absorbed therein a hydrocarbon fraction enriched in one of said C–8 isomers, thereby leaving an unabsorbed hydrocarbon fraction in liquid phase which is relatively enriched in another of said C–8 isomers, and thereafter recovering said hydrocarbon fractions separately from said clathrate phase and from said liquid phase.

6. A process as defined in claim 5 wherein said metal salt is selected from the group consisting of the cyanides, thiocyanates, isothiocyanates, azides, cyanates, and isocyanates of metals of atomic number above 12.

7. A process as defined in claim 5 wherein said metal salt is nickel thiocyanate.

8. A process as defined in claim 5 wherein said metal salt is ferrous thiocyanate.

9. A process as defined in claim 5 wherein said metal salt is manganous thiocyanate.

10. A process as defined in claim 5 wherein said metal salt is cobalt thiocyanate.

11. A process for resolving a mixture of aromatic hydrocarbons comprising essentially para-xylene and at least one member selected from the group consisting of ortho-xylene, meta-xylene and ethylbenzene by extractive crystallization with a solid Werner complex, said Werner complex consisting of a metal thiocyanate coordinated with 2 to 6 moles of a 4-alkylpyridine, which comprises dissolving said hydrocarbons and said Werner complex in a solvent, said solvent consisting essentially of a member selected from the group consisting of lower alkylene glycols and lower polyalkylene glycols, cooling the resulting solution to precipitate a solid clathrate phase composed of said Werner compex containing intimately absorbed therein a hydrocarbon fraction enriched in para-xylene, thereby leaving a para-xylene-lean hydrocarbon fraction in liquid phase, and thereafter recovering said hydrocarbon fractions separately from said clathrate phase and from said liquid phase.

12. A process as defined in claim 11 wherein said metal is selected from the group consisting of nickel, iron, cobalt and manganese.

13. A method for recovering an aromatic hydrocarbon from a clathrate thereof with a Werner complex, said Werner complex being composed of a metal salt coordinated with from 2 to 6 moles of a heterocyclic nitrogen base, which comprises dissolving said clathrate in a primary solvent consisting essentially of a lower aliphatic pclyhydroxy compound containing not more than 3 hydroxyl groups, extracting the resulting solution with a substantially immiscible tertiary solvent selected from the class consisting of paraffinic and naphthenic hydrocarbons, whereby a tertiary solvent extract phase is formed which contains dissolved aromatic hydrocarbons from said clathrate but is substantially free from said Werner complex, separating said extract phase and recovering aromatic hydrocarbon therefrom.

14. A process as defined in claim 13 wherein said Werner complex is composed of a salt of a metal of atomic number above 12 coordinated with from 2 to 6 moles of a pyridine base.

15. A method for recovering p-xylene from a clathrate thereof with a Werner complex, said Werner complex being composed of a metal salt coordinated with from 2 to 6 moles of a 4-substituted pyridine, said metal salt being selected from the class consisting of metal thiocyanates, isothiocyanates, cyanates, isocyanates, azides and cyanides, which comprises dissolving said clathrate in a primary solvent consisting essentially of a lower aliphatic polyhydroxy compound containing not more than 3 hydroxyl groups, extracting the resulting solution with a substantially immiscible tertiary solvent selected from the class consisting of paraffinic and naphthenic hydrocarbons, whereby a tertiary solvent extract phase is formed which contains dissolved para-xylene from said clathrate but is substantially free from said Werner complex, separating said extract phase and recovering para-xylene therefrom.

16. A process as defined in claim 15 wherein said Werner complex is nickel-tetra (4-methylpyridine) dithiocyanate.

17. A process as defined in claim 15 wherein said Werner complex is nickel-tetra (4-ethylpyridine) dithiocyanate.

18. A process as defined in claim 15 wherein said Werner complex is cobalt-tetra (4-methylpyridine) dithiocyanate.

19. A process as defined in claim 15 wherein said Werner complex is manganese-tetra (4-ethylpyridine) dithiocyanate.

20. A process for recovering an aromatic hydrocarbon dissolved in a primary solvent which is essentially a lower aliphatic polyhydroxy compound containing not more than 3 hydroxyl groups, said solution also containing a suspended solid phase comprising a Werner complex of a metal salt coordinated with from 2 to 6 moles of a heterocyclic nitrogen base, which comprises subjecting said solution together with said suspended Werner complex to solvent extraction with a substantially immiscible secondary solvent selected from the class consisting of paraffinic and naphthenic hydrocarbons, thereby extracting said dissolved aromatic hydrocarbon without extracting said Werner complex, and without extracting substantial quantities of said heterocyclic nitrogen base, and thereafter separating the secondary solvent extract from the primary solvent phase.

21. A process as defined in claim 20 wherein said solid phase is a clathrate of said Werner complex with an aromatic hydrocarbon.

22. A process for separating a mixture of aromatic hydrocarbons differing in molecular configuration which comprises dissolving said mixture of aromatic hydrocarbons and a Werner complex in a primary solvent consisting essentially of a lower aliphatic polyhydroxy compound containing not more than 3 hydroxyl groups, said Werner complex being composed of a metal salt coordinated with from 2 to 6 moles of a heterocyclic nitrogen base, cooling the resulting solution to form a slurry of a solid clathrate in said primary solvent whereby at least one of said aromatic hydrocarbons is selectively absorbed in said clathrate, recovering the unclathrated aromatic hydrocarbon component from said slurry by stripping said slurry with a substantially immiscible secondary solvent selected from the class consisting of paraffinic and naphthenic hydrocarbons, thereby forming an extract of non-clathrated aromatic hydrocarbon dissolved in said secondary solvent, separating said extract from said primary solvent phase, recovering said nonclathrated aromatic component from said secondary solvent extract, and recovering the clathrated hydrocarbon from said clathrate.

23. A process as defined in claim 22 wherein said clathrated hydrocarbon is recovered by reheating the stripped slurry from said secondary solvent extraction to redissolve said clathrate, and the resulting solution is then subjected to extraction with a substantially immiscible, tertiary solvent selected from the class consisting of paraffinic and naphthenic hydrocarbons to strip out the previously clathrated aromatic hydrocarbon, separating the tertiary solvent extract, and recovering aromatic hydrocarbon therefrom.

24. A process as defined in claim 22 wherein said clathrated hydrocarbon is recovered by boiling the stripped slurry from said secondary solvent extraction to recover overhead an azeotrope of primary solvent plus the previously clathrated aromatic hydrocarbon, condensing the resulting azeotrope, and separating aromatic hydrocarbon from the resulting two-phase liquid system.

25. A process for separating a mixture of aromatic hydrocarbons differing in molecular configuration which comprises dissolving said mixture of aromatic hydrocarbons and a Werner complex in a primary solvent consisting essentially of a lower aliphatic polyhydroxy compound containing not more than 3 hydroxyl groups, said Werner complex being composed of a metal salt coordinated with from 2 to 6 moles of a heterocyclic nitrogen base, cooling the resulting solution to form a slurry of a solid clathrate in said primary solvent whereby at least one of said aromatic hydrocarbons is selectively absorbed in said clathrate, separating said solid clathrate from its mother liquor, recovering unclathrated aromatic hydrocarbon component from said mother liquor by percolating said mother liquor downwardly through a multiplicity of confined tortuous passageways countercurrently to a secondary solvent selected from the class consisting of paraffinic and naphthenic hydrocarbons, thereby forming an extract of non-clathrated aromatic hydrocarbon dissolved in said secondary solvent, redissolving said solid clathrate in the stripped mother liquor from said secondary solvent extraction, removing the formerly clathrated aromatic hydrocarbon from said reconstituted solution, then dissolving fresh aromatic hydrocarbon mixture in said reconstituted solution and again cooling to effect clathration.

26. A process as defined in claim 25 wherein said formerly clathrated hydrocarbon is removed from said reconstituted solution by stripping the latter with a tertiary solvent selected from the class consisting of paraffinic and naphthenic hydrocarbons.

27. A multi-stage process for separating a mixture of aromatic hydrocarbons differing in molecular configuration which comprises dissolving said mixture of aromatic hydrocarbons and a Werner complex in a primary solvent which is essentially a lower aliphatic polyhydroxy compound containing not more than 3 hydroxyl groups, said Werner complex being composed of a metal salt coordinated with from 2 to 6 moles of a heterocyclic nitrogen base, cooling the resulting solution in a first clathration stage to a temperature $T_1$ to form a first slurry of a crude clathrate in said primary solvent whereby at least one of said aromatic hydrocarbon is selectively absorbed in said clathrate, subjecting the resulting slurry to a first stripping with a paraffinic hydrocarbon to recover the non-clathrated aromatic hydrocarbons, reheating the stripped slurry to redissolve said clathrate, cooling the resulting solution in a second clathration stage to a temperature $T_2$ which is above $T_1$, thereby forming a second slurry of rectified clathrate enriched in the most readily clathratable of said aromatic hydrocarbons, subjecting said second slurry to a second stripping with a paraffinic hydrocarbon to recover non-clathrated aromatic hydrocarbons, heating the rectified clathrate slurry to redissolve the same, and subjecting the resulting solution to a third stripping with a paraffinic hydrocarbon to recover said most readily clathratable hydrocarbons, and recycling the stripped primary solvent plus Werner complex to said initial contacting step.

28. A process as defined in claim 27 wherein a portion of said most readily clathratable aromatic hydrocarbons recovered from said third stripping stage is recycled to said second clathration stage.

29. A process as defined in claim 27 wherein the non-clathrated hydrocarbon fraction extracted during said second stripping stage is recycled to said first clathration stage.

30. A process as defined in claim 27 wherein the stripped clathrate slurry from said second stripping stage is reheated to redissolve the rectified clathrate, and a portion of the resulting solution is recycled to said second clathration stage.

31. A process as defined in claim 27 wherein said mixture of aromatic hydrocarbons consists essentially of C-8 aromatic hydrocarbons including para-xylene.

References Cited in the file of this patent

UNITED STATES PATENTS

| | | |
|---|---|---|
| 2,511,711 | Hetzner et al. | June 13, 1950 |
| 2,585,491 | Olsen | Feb. 12, 1952 |
| 2,588,506 | Fetterly | Mar. 11, 1952 |
| 2,596,344 | Newey et al. | May 13, 1952 |
| 2,627,513 | Arey | Feb. 3, 1953 |
| 2,642,379 | Dennis et al. | June 16, 1953 |
| 2,642,422 | Gorin | June 16, 1953 |
| 2,642,424 | Gorin et al. | June 16, 1953 |
| 2,653,122 | Arnold et al. | Sept. 27, 1953 |
| 2,656,301 | Findlay | Oct. 20, 1953 |
| 2,658,887 | Arnold | Nov. 10, 1953 |
| 2,663,671 | Wiles et al. | Dec. 22, 1953 |

OTHER REFERENCES

Proc. Roy. Soc. (London), vol. A191, pp. 22–31 (1947), Art. by Price et al. Abstracted in Chem. Abs., vol. 42, p. 1504 (1948).

J. Chem. Soc. (London), 1948, pp. 61–73.

Nature, vol. 163, pp. 566–7 (1949) Art. by Powell et al.

J. Chem. Soc. (London), 1950, p. 3346, Art. by Evans et al.

J. Chem. Phys., vol. 18 (1950), pp. 150–1, Art. by Smith.

J. Chem. Soc. (London) 1952 (February), pp 319–28, Art. by Rayner et al.

Kobe et al., "Petroleum Refiner," vol. 31, March 1952, pp. 106–113.